UNITED STATES PATENT OFFICE.

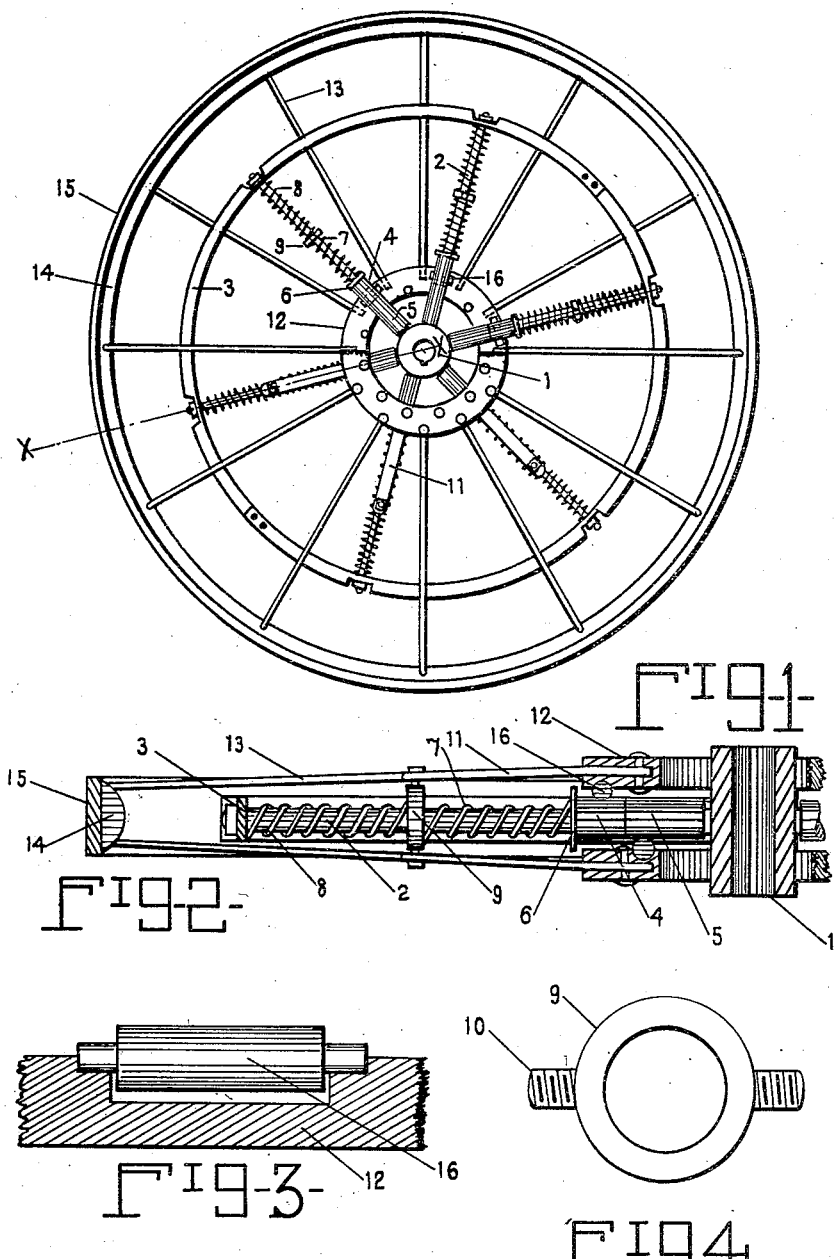

ALFRED R. WYLIE AND JAMES G. WRIGHT, OF BIG SPRING, TEXAS.

VEHICLE-WHEEL.

1,005,399.   Specification of Letters Patent.   Patented Oct. 10, 1911.

Application filed March 4, 1910. Serial No. 547,214.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Vehicle-Wheels, of which the following is a specification.

Our invention relates to new and useful improvements in vehicle wheels. Its object is to provide a vehicle wheel, especially adapted for use upon automobiles, equipped with a substitute for the pneumatic tire, of cheaper and more lasting construction than such a tire.

Another object is to provide a vehicle wheel, having a plurality of coiled springs mounted radially from the hub, to take up the shocks and jars imparted to the rim.

A further object is to provide means for reducing the friction between the wheel parts, occasioned by the contraction and expansion of said springs.

Finally, the object of the invention is to provide a device of the character described, that will be strong, durable, simple and efficient, and comparatively easy to construct.

With these and various other objects in view our invention has relation to certain novel features of construction and operation, an example of which is described in the following specification and illustrated in the accompanying drawing, wherein:

Figure 1 is a side elevation of the wheel, the upper half of the near inner ring to which the spokes are attached being broken away. Fig. 2 is a sectional view of half the wheel, taken on the line $x$—$x$ of Fig. 1. Fig. 3 is a detail of one of the small rollers which are employed to reduce the friction due to the vibration of the springs. Fig. 4 is a detail view of a collar of special construction, the purpose of which is made clear hereinafter.

Referring now more particularly to the drawing, wherein like numerals of reference designate similar parts in all the figures, the numeral 1 denotes the central hub of the wheel, which is adapted to receive the axle of an automobile or other vehicle. From this hub, a number of circular rods 2 project radially, the outer extremities of said rods being connected and braced by a ring 3. The connection between the hub 1 and the rods 2 may be made in any manner to secure rigidity. Upon each of the rods 2, adjacent to the hub 1, a pair of rotatable sleeves 4 and 5 are mounted, the purpose of which is fully explained hereinafter. Adjacent to the outer extremity of each sleeve 4, a collar 6 is rigid upon each rod 2. Upon each of the rods 2, there are also mounted coiled springs 7 and 8, separated by a sliding collar 9. The inner extremities of the springs 7 bear against the collars 6, and their outer extremities bear against the collars 9. The sliding collars 9 are each provided with oppositely positioned threaded studs 10, to receive the outer extremities of arms 11, projecting radially in opposite pairs from rings 12, to which said arms are pivotally secured. From each of the rings 12, a plurality of spokes 13 extend radially, their outer extremities being rigidly secured to a wooden felly 14. A steel rim 15 is shrunk upon the felly 14 or secured thereto by other suitable means. In the rings 12 contiguous with the rotatable sleeves 4 and 5, at each side thereof rollers 16 are mounted.

This wheel may be considered to consist of two frames, between which the springs 7 and 8 form a yielding connection. The tire, felly, spokes, rings 12 and arms 11 together constitute one frame, and the hub, with its radial rods and the ring 3 the other. When an obstacle or inequality is encountered by the tire of the wheel in the course of its rotation, there results an upward displacement of the frame of which the tire forms a part, relative to the central frame consisting of the hub 1 and rods 2. Consequently there is an upward displacement of the sliding collars 9 upon such of the rods 2 as are not too far inclined from the vertical, to allow a vertically acting impulse to displace said collars. This upward movement of the collars 9 will produce a compression of the springs 8 upon the upper rods 2 and also of the springs 7 upon the lower rods. There will also result an expansion of the springs 7 upon the upper rods 2 and of the springs 8 upon the lower rods. It is obvious that the amount of expansion or contraction in the springs 7 and 8 is inversely proportional to the angle between the line in which the shock acts (which line is approximately vertical) and the rods 2 on which the springs are mounted. If this angle is 0, and the rod carrying the springs coincides with the direction of the shock or is approximately vertical, there results a maximum displacement of the collar 9 and a maximum distortion of the springs. If on the other hand, the rod 2 is approximately horizontal, there will be no displacement of the collar 9 upon the rod, and the relative movement between the two component frames of the wheel will be compensated for by a pivotal motion of the arms 11 adjacent to the rods in question, about their connections to the rings 12. The rollers 16, contiguous with the sleeves 4 and 5, act to prevent transverse shifting of the frame of which the tire forms a part, when the wheel is subject to a side thrust, as in turning corners. When there is radial motion between the two component frames, due to the vibration of the springs 7 and 8, the rollers 16 rotate and thus lessen the friction. When rotation is applied to the driving axle through a motor carried by the vehicle, there occurs at first a slight rotation of the hub 1 and rods 2, relative to the other frame of the wheel. This slight rotation brings the arms 11 into a position to bear upon the spokes 13, so that the wheel is rotated as a whole. When the driving member of the wheel is that frame which contains the tire as in the case of buggies and wagons or the front wheels of an automobile, the reverse takes place. That is to say, the spokes 13 are brought to bear against the arms 11, producing rotation of the wheel as a whole. When the two component frames of the wheel undergo circular motion relative to each other as just described, the friction is reduced by the rotation of the rollers 4 and 5. Two of these rollers are employed as the contact at opposite sides would tend to prevent rotation if there were but one roller.

The above-described wheel is superior to wheels using pneumatic tires not only in economy and durability but also in quality of service given, since there can be no puncture, blowouts or slipping of the steel tire.

We are aware that changes may be made in the form and proportion of parts and details of construction of the device herein described as a preferable embodiment of our invention without departing from the spirit or sacrificing the advantage thereof, and we, therefore, reserve the right to make such changes and alterations in said device as fairly come within the scope of the following claims.

What we claim is:—

1. In a vehicle wheel, the combination with the rim, spokes and hub thereof, of a pair of rings concentric with the hub, to which the inner extremities of the spokes are attached, arms projecting radially from said rings, and pivotally attached thereto, rods projecting radially from the hub, a pair of sleeves rotatable upon each of said rods adjacent to the hub, rollers mounted in said rings contiguous with said sleeves at each side thereof, a collar slidable upon each of said rods to which the outer extremities of said arms are pivotally attached, and a spring coiled upon each rod, adapted to be distorted by sliding displacement of the collar.

2. In a vehicle wheel, the combination with the rim, spokes and hub thereof, of a pair of rings concentric with the hub, to which the inner extremities of the spokes are attached, arms projecting radially from said rings and pivotally attached thereto, rods projecting radially from the hub, a pair of sleeves rotatable upon each of said rods adjacent to the hub, rollers mounted in said rings contiguous with said sleeves at each side thereof, a collar slidable upon each of said rods to which the outer extremities of said arms are pivotally attached, and springs coiled upon each rod at each side of said collar, one of which is adapted to be compressed and the other expanded when the collar undergoes sliding displacement.

3. In a vehicle wheel, the combination with the rim, spokes and hub thereof, of a pair of rings concentric with the hub to which the inner extremities of the spokes are attached, arms projecting radially from said rings and pivotally attached thereto, rods projecting radially from the hub, collars slidable upon said rods, having pivotal attachment to the outer extremities of said arms, a spring coiled upon each rod adapted to be distorted by sliding displacement of the collar thereupon, and means for reducing the friction due to relative motion between the hub and said rings.

In testimony whereof we have signed our names to this specification in the presence of two subscribing witnesses.

ALFRED R. WYLIE.
JAMES G. WRIGHT.

Witnesses:
J. S. MURRAY,
EUGENIA HENSLEY.